US012770861B2

(12) United States Patent
Kim et al.

(10) Patent No.: US 12,770,861 B2
(45) Date of Patent: Oct. 20, 2026

(54) POSITIVE ELECTRODE ACTIVE MATERIAL FOR SECONDARY BATTERY, MANUFACTURING METHOD THEREOF, FREESTANDING FILM COMPRISING THE SAME, DRY ELECTRODE AND SECONDARY BATTERY COMPRISING DRY ELECTRODE

(71) Applicant: LG Energy Solution, Ltd., Seoul (KR)

(72) Inventors: Jeonggil Kim, Daejeon (KR); Taegon Kim, Daejeon (KR); Myeongsoo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 670 days.

(21) Appl. No.: 18/031,364

(22) PCT Filed: Nov. 26, 2021

(86) PCT No.: PCT/KR2021/017663

§ 371 (c)(1),
(2) Date: Apr. 12, 2023

(87) PCT Pub. No.: WO2022/114860

PCT Pub. Date: Jun. 2, 2022

(65) Prior Publication Data

US 2023/0378441 A1 Nov. 23, 2023

(30) Foreign Application Priority Data

Nov. 30, 2020 (KR) ........................ 10-2020-0164640
Nov. 24, 2021 (KR) ........................ 10-2021-0163398

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/485* (2013.01);
(Continued)

(58) Field of Classification Search
CPC ........ H01M 4/36; H01M 4/362; H01M 4/364; H01M 4/366
See application file for complete search history.

(56) References Cited

U.S. PATENT DOCUMENTS

2006/0093920 A1 5/2006 Cheon et al.
2010/0140554 A1 6/2010 Oki et al.
(Continued)

FOREIGN PATENT DOCUMENTS

CN 102496701 A 6/2012
CN 108028374 A 5/2018
(Continued)

OTHER PUBLICATIONS

Machine translation: JP-2009043514-A, Yano Tsuyoshi, (Year: 2025).*
(Continued)

*Primary Examiner* — Kendra Ly
(74) *Attorney, Agent, or Firm* — Lerner David LLP

(57) ABSTRACT

A positive electrode active material for secondary battery includes lithium transition metal oxide particles; an amorphous carbon-based coating layer formed in the form of a coating film on the surface of the lithium transition metal oxide particles; and a carbon nanotube coating layer formed on the amorphous carbon-based coating layer. A method for manufacturing the same and a freestanding film including the same are also provided. Further, a dry positive electrode; and a secondary battery including the dry positive electrode are also provided.

11 Claims, 1 Drawing Sheet

(51) Int. Cl.

| | |
|---|---|
| ***H01M 4/485*** | (2010.01) |
| ***H01M 4/583*** | (2010.01) |
| ***H01M 4/62*** | (2006.01) |
| ***H01M 10/052*** | (2010.01) |
| *H01M 4/02* | (2006.01) |

(52) U.S. Cl.

CPC ........... *H01M 4/583* (2013.01); *H01M 4/623* (2013.01); *H01M 10/052* (2013.01); *H01M 2004/021* (2013.01); *H01M 2004/028* (2013.01)

(56) References Cited

U.S. PATENT DOCUMENTS

| | | | | |
|---|---|---|---|---|
| 2013/0029220 | A1 | 1/2013 | Han et al. | |
| 2014/0315089 | A1 | 10/2014 | Yu et al. | |
| 2015/0037673 | A1 | 2/2015 | Zaghib et al. | |
| 2015/0349333 | A1* | 12/2015 | Park ...................... | H01M 4/485 429/215 |
| 2016/0197343 | A1 | 7/2016 | Jeong et al. | |
| 2016/0204424 | A1 | 7/2016 | Sawai et al. | |
| 2017/0125813 | A1 | 5/2017 | Zaghib et al. | |
| 2018/0254482 | A1 | 9/2018 | Matsuu | |
| 2018/0287155 | A1 | 10/2018 | Zaghib et al. | |
| 2019/0097214 | A1 | 3/2019 | Yamaya et al. | |
| 2019/0237748 | A1 | 8/2019 | Shin et al. | |
| 2020/0203767 | A1 | 6/2020 | Cheng et al. | |
| 2021/0020898 | A1 | 1/2021 | Lee et al. | |
| 2021/0066718 | A1 | 3/2021 | Zaghib et al. | |
| 2022/0013761 | A1 | 1/2022 | Shimamura et al. | |

FOREIGN PATENT DOCUMENTS

| | | | | |
|---|---|---|---|---|
| CN | 112913049 | A | | 6/2021 |
| JP | 2000208147 | A | | 7/2000 |
| JP | 2006128119 | A | | 5/2006 |
| JP | 2008034376 | A | | 2/2008 |
| JP | 2009043514 | A | * | 2/2009 |
| JP | 2016533014 | A | | 10/2016 |
| JP | 2017073334 | A | | 4/2017 |
| JP | 2018063755 | A | | 4/2018 |
| JP | 2020527290 | A | | 9/2020 |
| KR | 20130013524 | A | | 2/2013 |
| KR | 20140082988 | A | | 7/2014 |
| KR | 20140126585 | A | | 10/2014 |
| KR | 2015-0137888 | A | | 12/2015 |
| KR | 20160085089 | A | | 7/2016 |
| KR | 20180001066 | A | | 1/2018 |
| KR | 20180071106 | A | | 6/2018 |
| KR | 101991408 | B1 | | 6/2019 |
| KR | 20190109284 | A | | 9/2019 |
| KR | 20200090744 | A | | 7/2020 |
| WO | 2016032222 | A1 | | 3/2016 |
| WO | 2019103874 | A1 | | 5/2019 |

OTHER PUBLICATIONS

Machine translation: JP-2009043514-A, Yano Tsuyoshi, (Year: 2026).*

Extended European Search Report including Written Opinion for Application No. 21898685.9 dated Sep. 13, 2024. 10 pgs.

Park Yang-Kyu et al: "Robust 13 Free-standing Electrodes for Flexible Lithium-ion Batteries Prepared by a Conventional Electrode Fabrication Process", Electrochimica Acta, Elsevier, Amsterdam, NL, vol. 247, Jul. 8, 2017 (Jul. 8, 2017), pp. 371-380, XP085183395.

International Search Report for PCT/KR2021/017663 mailed Mar. 8, 2022. 3 pages.

* cited by examiner

【FIG. 1】
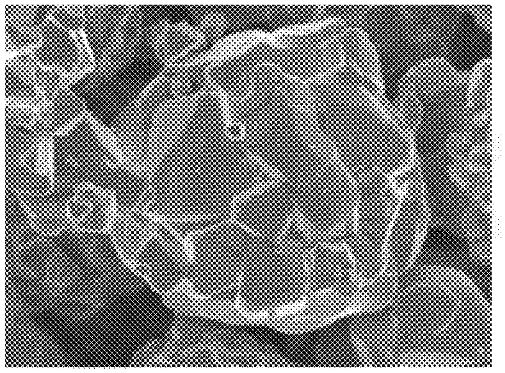
【FIG. 2】
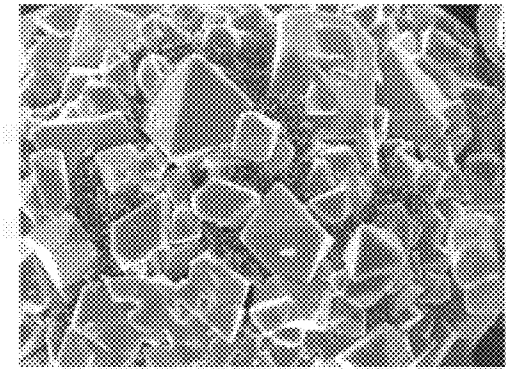

POSITIVE ELECTRODE ACTIVE MATERIAL FOR SECONDARY BATTERY, MANUFACTURING METHOD THEREOF, FREESTANDING FILM COMPRISING THE SAME, DRY ELECTRODE AND SECONDARY BATTERY COMPRISING DRY ELECTRODE

CROSS-REFERENCE TO RELATED APPLICATIONS

This application is a national phase entry under 35 U.S.C. § 371 of International Application No. PCT/KR2021/017663, filed on Nov. 26, 2021, which claims the benefit of Korean Patent Application No. 10-2020-0164640 filed on Nov. 30, 2020 and Korean Patent Application No. 10-2021-0163398 filed on Nov. 24, 2021 in the Korean Intellectual Property Office, the disclosures of which are incorporated herein by reference in their entirety.

TECHNICAL FIELD

The present disclosure relates to a positive electrode active material for secondary battery, a manufacturing method thereof, a freestanding film comprising the same, a dry positive electrode, and a secondary battery including the dry positive electrode.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Among these secondary batteries, a typical lithium secondary battery has been used as an energy source for mobile devices, and recently, use thereof as a power source of an electric vehicle or a hybrid electric vehicle, which can replace the vehicles, such as a gasoline vehicle, a diesel vehicle, or the like, using fossil fuel, one of major causes of air pollution, has been realized. The market for lithium secondary batteries continues to expand to applications such as auxiliary power suppliers through grid formation.

The manufacturing process of such a lithium secondary battery is largely divided into three steps: an electrode process, an assembly process, and a formation process. The electrode process is again divided into an active material mixing process, an electrode coating process, a drying process, a rolling process, a slitting process, a winding process, and the like.

Among them, the active material mixing process is a process of mixing a coating material for forming an electrode active layer in which an actual electrochemical reaction occurs in the electrode. Specifically, it is prepared in the form of a slurry having fluidity by mixing an electrode active material that is an essential element of an electrode, a conductive material and a filler that are other additives, a binder for binding between particles and adhering to a current collector, a solvent for imparting viscosity and dispersing particles, and the like.

The composition mixed for forming the electrode active layer in this way is also referred to as an electrode mixture in a broad sense.

After that, an electrode coating process of applying the electrode mixture onto an electrically conductive current collector, and a drying process of removing the solvent contained in the electrode mixture are performed, and additionally, the electrode is rolled and manufactured to a predetermined thickness.

Meanwhile, as the solvent contained in the electrode mixture evaporates during the drying process, defects such as pinholes or cracks may be induced in the pre-formed electrode active layer. Further, since the inside and outside of the active layer are not dried uniformly, the particle floating phenomenon occurs due to the difference in solvent evaporation rate, that is, the particles of the portion to be dried first may float up, and a gap may be formed with the portion to be dried relatively later, so that the electrode quality may be deteriorated. Therefore, there is a fatal drawback that manufacture of a thick film electrode is difficult.

Therefore, in order to solve the above problems, a drying device capable of adjusting the evaporation rate of the solvent while allowing the inside and outside of the active layer to be dried uniformly is being considered, but such drying devices are very expensive and require considerable cost and time to operate, which are disadvantageous in terms of the manufacturing processability.

Therefore, recently, research on manufacturing a dry electrode that does not use a solvent has been actively conducted.

The dry electrode is generally manufactured by laminating a freestanding film produced in the form of a film containing an active material, a binder, a conductive material and the like, on a current collector.

Therefore, it is in the spotlight as an innovative technology that enables manufacture of a thick-film electrode, makes the use of an organic solvent harmful to the human body unnecessary, and simultaneously solves the high process costs due to a long drying.

Meanwhile, when manufacturing such a dry electrode, polytetrafluoroethylene (PTFE) powder is mainly used as a binder. In such a PTFE, long fibers are stacked neatly inside the particles, and when a shearing force is applied under specific conditions, they are pulled out long into fibers, and these fibers play a role of connecting the active material and the active material, and the active material and the conductive material to maintain the electrode shape.

However, PTFE does not rub well on the smooth surface of the positive electrode material, so it is difficult to receive a shearing force and thus, it becomes difficult to activate the fiberization. Further, if PTFE fiberization is not activated, not only it is difficult to maintain the shape of the electrode, but also it adversely affects electrode productivity and cell durability, whereby the PTFE fiberization is very important.

Therefore, there is an urgent need to develop a dry electrode technology capable of solving the above problems.

DETAILED DESCRIPTION OF THE INVENTION

Technical Problem

The present disclosure has been designed to solve the above-mentioned problems, and an object of the present disclosure is to provide a positive electrode active material that not only facilitates activation of PTFE binder fiberization, but also improves the conductive path between active materials and reduces the battery resistance, and a method for manufacturing the same.

Another object of the present disclosure is to provide a dry electrode comprising such a positive electrode active material, and finally, a secondary battery capable of improving lifespan and output characteristics, including the dry electrode.

Technical Solution

According to one embodiment of the present disclosure, there is provided a positive electrode active material for secondary battery comprising:

lithium transition metal oxide particles;

an amorphous carbon-based coating layer formed in the form of a coating film on the surface of the lithium transition metal oxide particles; and a carbon nanotube coating layer formed on the amorphous carbon-based coating layer.

In one specific embodiment, the amorphous carbon-based coating layer may be physically bound to the lithium transition metal oxide particles in the form of a coating film.

Further, the amorphous carbon-based coating layer may include carbon black.

In one specific embodiment, the carbon nanotube coating layer may have a pi-pi interaction with the amorphous carbon-based coating layer.

In one specific embodiment, an amorphous carbon-based material of the amorphous carbon-based coating layer and a carbon nanotube of the carbon nanotube coating layer may be contained in an amount of 0.01 to 5% by weight based on the total weight of the positive electrode active material, respectively.

The positive electrode active material may have a convexity of 0.6 to 0.9.

Meanwhile, according to another embodiment of the present disclosure, there is provided a method for manufacturing the positive electrode active material for secondary battery, the method comprising the steps of:

(a) primarily coating an amorphous carbon-based material in the form of a coating film on the surface of a lithium transition metal oxide particle; and (b) secondarily coating carbon nanotubes onto the primarily coated surface of the lithium transition metal oxide particle to prepare a positive electrode active material.

In this case, in one specific embodiment, the amorphous carbon-based material in step (a) has a hollow structure and may be physically bound to the surface of the lithium transition metal oxide particle in the form of a coating film while the hollow structure is collapsed during coating.

Further, the coating of steps (a) and (b) may be performed by a mechanofusion process.

In another specific embodiment, a carbon of the carbon nanotubes in step (b) may form a pi-pi interaction with a carbon of the amorphous carbon-based material.

In this case, in one specific embodiment, the amorphous carbon-based material and the carbon nanotube in steps (a) and (b) may be coated so as to be contained in an amount of 0.01 to 5% by weight based on the total weight of the positive electrode active material, respectively.

Meanwhile, according to another embodiment of the present disclosure, there is provided a freestanding film comprising: the positive electrode active material and a binder, wherein the binder comprises polytetrafluoroethylene (PTFE).

In one specific embodiment, the polytetrafluoroethylene may have a form in which the active material is wound in the form of a fiber.

In a further specific embodiment, the freestanding film may further include a conductive material.

In a further specific embodiment, a room-temperature tensile strength of the freestanding film may be 0.17 to 1 $kgf/mm^2$.

Meanwhile, according to yet another embodiment of the present disclosure, there is provided a dry positive electrode in which the freestanding film is formed on a positive electrode current collector, and a secondary battery comprising the same.

BRIEF DESCRIPTION OF THE DRAWINGS

FIG. 1 is a SEM photograph showing that the amorphous carbon-based coating layer according to Preparation Example 1 is formed in the form of a coating film; and FIG. 2 is a SEM photograph showing that the amorphous carbon-based coating layer according to Comparative Preparation Example 1 is formed in the form of particles.

DETAILED DESCRIPTION OF THE EMBODIMENTS

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a," "an," and "the" are intended to include the plural forms as well, unless the context clearly indicates otherwise.

Further, throughout the specification, when a portion is referred to as "including" a certain component, it means that the portion can further include other components, without excluding the other components, unless otherwise stated.

According to one embodiment of the present disclosure, there is provided a positive electrode active material for secondary battery comprising:

lithium transition metal oxide particles;

an amorphous carbon-based coating layer formed in the form of a coating film on the surface of the lithium transition metal oxide particles; and a carbon nanotube coating layer formed on the amorphous carbon-based coating layer.

Here, the lithium transition metal oxide particles of the positive electrode active material include all conventionally known lithium transition metal oxides containing lithium, a transition metal, and oxygen, and examples thereof include a layered compound such as lithium cobalt oxide ($LiCoO_2$) or lithium nickel oxide ($LiNiO_2$) or a compound substituted with one or more transition metals; lithium manganese oxides such as chemical formulae $Li_{1+x}Mn_{2-x}O_4$ (where, x is 0~0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}MxO_2$ (where, M=Co, Mn, Al, Cu, Fe, Mg, B or Ga, and x=0.01~0.3); lithium manganese composite oxide represented by chemical formulae $LiMn_{2-x}MxO_2$ (where, M=Co, Ni, Fe, Cr, Zn or Ta, and x=0.01~0.1) or $Li_2Mn_3MO_8$ (where, M=Fe, Co, Ni, Cu or Zn); $LiMn_2O_4$ in which a portion of Li in the chemical formula is substituted with an alkaline earth metal ion, as well as lithium metal phosphate $LiMPO_4$ (where, M is M=Fe, CO, Ni, or Mn) in the form of a phosphorus oxide, and the like.

However, the lithium transition metal oxide particles generally used as the active material in this way usually have a smooth surface, and when polytetrafluoroethylene (PTFE) is used as a binder for the production of a dry positive electrode, the lithium transition metal oxide particles and PTFE are not easily rubbed and thus, it is difficult to receive a shearing force, which causes a problem that activation of the fiberization is difficult even through the high shear mixing.

Therefore, the present inventors conducted in-depth research and various experiments and as a result, found that when the lithium transition metal oxide particles are coated with a carbon-based material, it is possible to obtain double effects, i.e., the degree of unevenness on the particle surface is remarkably improved while the conductive path is improved, and also the fiberization of PTFE using high shear mixing is activated.

However, among the above carbon-based materials, the amorphous carbon-based material is partially improved in the fiberization of PTFE due to the improvement of the conductivity of lithium transition metal oxide and the increase of the surface unevenness, but lacks conductive paths between active materials on the particles. When carbon nanotubes are coated directly onto the surface of lithium transition metal oxide, the carbon nanotubes are in the form of tubes and thus, coating is not performed well, and agglomeration occurs at the primary particle interface, which causes a problem that the utilization degree relative to the addition amount decreases.

Further, if the materials are added together to solve these problems, the carbons have a good affinity with each other and are not coated with the lithium transition metal, and the probability of allowing the amorphous carbon-based material and the carbon nanotubes to be agglomerated with each other is high.

Therefore, the present inventors have found that when an amorphous carbon-based material capable of smoothly coating in the form of particles is first coated onto the surface of the lithium transition metal oxide, and then carbon nanotubes are coated, it is possible to obtain double effects, i.e., the carbon of the amorphous carbon-based material and the carbon of the carbon nanotube have a pi-pi interaction while solving these problems, carbon nanotubes do not detach easily, are coated smoothly, improves the conductive path between active materials, reduces battery resistance, improves lifespan and output characteristics, and also significantly improve the degree of unevenness on the surface of active material particles, and during high shear mixing, the fiberization of PTFE is activated by friction, thereby completing the present disclosure.

Therefore, the order of coating is very important, and if mixed together or vice versa to form a coating layer, the intended effect of the present disclosure cannot be obtained.

Specifically, the amorphous carbon-based coating layer is not limited as long as it is amorphous carbon, and various materials may be included, and specifically, soft carbon, hard carbon, mesophase pitch carbide, or calcined coke, and the like may be included. Among these, carbon black, acetylene black, ketjen black, channel black, furnace black, lamp black, thermal black, and the like may be included, and specifically, carbon black can be included, and more specifically, the amorphous carbon-based coating layer can be a carbon black coating layer.

In this case, the amorphous carbon-based coating layer is not coated in a particulate form, but may be physically bound to the lithium transition metal oxide particles in the form of a coating film.

Specifically, with the coating in the particulate form, the pi-pi interaction with carbon nanotubes cannot be firmly formed, and the possibility of desorption together from the surface of the lithium transition metal oxide is high, whereby by firmly physically binding to the surface of the lithium transition metal oxide in the form of a coating film, it is possible to effectively prevent desorption from the active material by a subsequent high shear mixing or the like.

Therefore, the formation of the amorphous carbon-based coating layer is not limited as long as it can be formed in the form of a coating film as described above. For example, it may be performed by a high shear mechanofusion process in order to increase the easiness of the production process and the physical binding strength of the amorphous coating layer.

Otherwise, if the positive electrode active material and the amorphous carbon precursor are mixed and heat-treated, a chemical reaction may occur and the oxidation number on the surface of the positive electrode is likely to be changed. If the positive electrode active material and amorphous carbon are simply mixed, it cannot be properly formed in the form of a coating film, and the amorphous carbon particles agglomerate and exist at the primary particle interface of the active material. Thus, when performed by the mechanofusion process, which is a physical coating that receives a high shearing force of thousands of rpm in a narrow gap between the vessel and the impeller, it can achieve a thin and uniform surface coating, which is thus most preferable.

The carbon nanotube coating layer may be formed on the surface of the amorphous carbon-based coating layer after the amorphous carbon-based coating layer is formed.

At this time, the carbon nanotube coating layer is not limited, but it is also preferably coated by a mechanofusion process.

Meanwhile, in the amorphous carbon-based coating layer and the carbon nanotube coating layer, the amorphous carbon-based material and the carbon nanotube may be contained in an amount of 0.01 to 5% by weight, specifically 0.05 to 3% by weight, based on the total weight of the active material, respectively.

That is, the amorphous carbon-based material may also be contained in an amount of 0.01 to 5% by weight, specifically, 0.05 to 3% by weight, based on the total weight of the active material, and the carbon nanotubes may also be contained in an amount of 0.01 to 5% by weight, specifically, 0.05 to 3% by weight, based on the total weight of the active material.

When the content of each material is too small outside the above range, the coating layer is not properly formed and thus, the intended conductive path improvement and PTFE fiber activation effect cannot be obtained by forming the coating layer, which is not preferable. When the content is too high, the content of the coating layer is relatively increased, which is not preferable in terms of the energy density of the battery.

When contained in the above range, the respective coating layers may be formed specifically in a thickness of 100 nm to 2 μm, more specifically in a thickness of 300 nm to 1.5 μm.

Meanwhile, the positive electrode active material in which the double coating layer is formed in this way may have a convexity of 0.6 to 0.9, specifically 0.65 to 0.85, more specifically 0.7 to 0.85, most specifically 0.75 to 0.8.

The convexity refers to the degree of smoothness of the surface, and may be measured, for example, by a Morphologi4 device (available from Marven). When the convexity is 1, it means a perfect spherical shape, and as the convexity is more excessive, it has a value close to 0.

When the convexity of the positive active material is too high outside the above range, it means that it is smooth near a perfect sphere, and PTFE is not easily rubbed during mixing, making it difficult to obtain a shearing effect. When the convexity is too low, there is a problem that the surface curvature is severe and the PTFE particles are trapped at the deep boundary, which is not preferable.

Furthermore, according to another embodiment of the present disclosure, there is provided a method for manufacturing the positive electrode active material for secondary battery, the method comprising the steps of:

(a) primarily coating an amorphous carbon-based material in the form of a coating film on the particle surface of a lithium transition metal oxide; and (b) secondarily coating carbon nanotubes onto the primarily coated particle surface to prepare a positive electrode active material.

As explained above, the amorphous carbon-based material is preferably coated in the form of a coating film rather than a particulate form on the particle surface of the lithium transition metal oxide.

Therefore, the amorphous carbon-based material may have, specifically, a hollow structure so that a coating layer in the form of a coating film can be easily formed by a dry mechanofusion process, and it can be physically bound to the surface of the lithium transition metal oxide in the form of a coating film while the structure is collapsed during coating.

Meanwhile, by the coating of step (b), the carbon of the carbon nanotube forms a pi-pi interaction with the carbon of the amorphous carbon-based material, and can be coated so that the carbon nanotubes are firmly bound and not detached.

In this case, the coating of steps (a) and (b) may be performed by a mechanofusion process, as described above.

Further, as described above, in steps (a) and (b), the amorphous carbon-based material and the carbon nanotube are respectively coated in an amount of 0.01 to 5% by weight, specifically 0.05 to 3% by weight, based on the total weight of the active material.

Meanwhile, according to another embodiment of the present disclosure, there is provided a freestanding film comprising: the positive electrode active, and a binder, wherein the binder comprises polytetrafluoroethylene (PTFE).

The freestanding film is generally the same in that it produces a mixture including an active material and a binder, but this mixing is not performed in a solvent but performed in the form of a powder.

Specifically, the freestanding film is produced as follows: first, a mixture containing a positive electrode active material and a binder is mixed under high shear to fiberize the PTFE in the binder, and the active material is wound in the form of fibers to bind to each other, which is then rolled for forming a freestanding film corresponding to the positive electrode mixture.

This rolling is called calendering. Through such calendering, the mixture may be in the form of a film having an average thickness of, for example, 1 μm to 300 μm.

At this time, the rolling may be performed, for example, by face-to-face type rolls, wherein the roll temperature may be 30° C. to 100° C., the rotation speed of the roll may be 1 rpm to 40 rpm.

Since the freestanding film thus produced does not contain a solvent, it can be easily handled, can be processed into a desired form, and can be used for producing various types of positive electrodes. In addition, since the drying step for removing the solvent can be omitted, the manufacturing processability of the positive electrode can be improved and the process cost can be greatly reduced.

Meanwhile, the freestanding film may further include a conductive material, and in this case, the PTFE binder has a form in which not only the active material but also the conductive material has a form in which the conductive material is wound in the form of fibers.

Therefore, the binder must essentially contain PTFE. In this case, the PTFE may be contained, specifically, in an amount of 50% by weight or more based on the total weight of the binder. In this case, it goes without saying that the binder may further include PEO (polyethylene oxide), PVdF (polyvinylidene fluoride), PVdF-HFP (polyvinylidene fluoride-co-hexafluoropropylene), and the like. However, in detail, the binder may include only PTFE.

The conductive material is not particularly limited as long as it has high conductivity without causing a chemical change in the corresponding battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives can be used. Specifically, the conductive material may include at least one selected from the group consisting of activated carbon, graphite, carbon black, and carbon nanotubes for uniform mixing and improvement of conductivity, and more specifically, it may include activated carbon.

The conductive material is in the form of being physically coated onto the surface of the positive electrode active material, and when the positive electrode active material according to the present invention is used, it has sufficient conductivity even by a small amount of the conductive material, which is more preferable in terms of energy density of the battery.

The mixing ratio of the active material, binder and conductive material is a weight ratio of the active material: binder:conductive material, which may be contained in a ratio of 85 to 99% by weight:0.5 to 10% by weight:0 to 5% by weight, and in a ratio of 90 to 99% by weight:0.5 to 5% by weight:0.5 to 5% by weight.

When the content of the binder is too high outside the above range, the binder is excessively fiberized in the subsequent high shear mixing process, and the processability may be reduced. When the content of the binder is too small, there is a problem that sufficient fiberization is not achieved and the physical strength of the electrode is weakened.

Further, if the content of the conductive material is too high outside the above range, the content of the active material is relatively reduced, which causes a problem that the energy density of the battery is reduced.

Meanwhile, in some cases, a filler, which is a component for suppressing the expansion of the electrode, may be additionally added to the freestanding film. The filler is not particularly limited as long as it is a fibrous material without causing a chemical change in the battery. For example, olefin-based polymers, such as polyethylene and a polypropylene; fibrous materials such as glass fiber or carbon fiber are used.

As described above, when the positive electrode active material according to the present disclosure is included, the fiberization of PTFE is easily performed, whereby the binding force between the active materials is increased, and the freestanding film is well formed, and therefore, the room-temperature tensile strength of the freestanding film can be improved.

Specifically, the room-temperature tensile strength of the freestanding film may be 0.17 to 1 $kgf/mm_2$, specifically, 0.17 to 0.95 $kgf/mm^2$, more specifically 0.2 to 0.3 $kgf/mm^2$, and most specifically 0.2 to 0.25 $kgf/mm^2$.

The room-temperature tensile strength is measured according to JIS C 6511 test method adopted as a mechanical property evaluation standard in the copper foil industry, in which the freestanding film is pulled at a crosshead speed of 50 mm/min at room temperature in the MD direction using the testing machine UTM (manufactured by Zwick-Roell in Germany, model name; Z2.5TN), and then the load at the time when the specimen is broken can be measured. At this time, the tensile strength is calculated as follows.

$$\text{Tensile strength } (kgf/mm^2) = \text{load value } (kgf)/\text{thickness } (mm) \times \text{width } (mm)$$

When the room-temperature tensile strength is too small outside the above range, there is a risk of breakage and defects during the process, and battery durability is weakened, which is not preferable.

The freestanding film is then compressed on a positive electrode current collector and manufactured into a dry positive electrode.

Therefore, according to the present disclosure, there is also provided a dry positive electrode in which the freestanding film is formed on a positive electrode current collector.

Compression, i.e., lamination, for producing the dry positive electrode may also be performed by a laminating roll, wherein the laminating roll can be maintained at a temperature of 30° C. to 200° C.

The positive electrode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, and the like can be used. The current collector may have fine irregularities formed on the surface of the current collector to increase the adhesion of the positive electrode active material. For example, it may be used in various forms such as films, sheets, foils, nets, porous bodies, foams, and nonwoven fabrics.

Meanwhile, according to yet another embodiment of the present disclosure, a secondary battery including the dry positive electrode is provided. Specifically, it may be formed in a structure in which the electrode assembly including the dry positive electrode, the separator, and the negative electrode is built in a battery case together with the electrolyte solution. Since other configurations of the secondary battery are conventionally known, the description thereof will be omitted.

Hereinafter, for easy understanding by those skilled in the art, the present disclosure is described in detail by way of Examples, Comparative Examples, and Experimental Examples,

Preparation Example 1

A carbon black having a hollow structure was mixed with a $LiMnO_2$ active material in an amount of 1.5 wt. % relative to the active material by a mechanofusion process using an NOB-130 device (available from Hosokawa Micron), and the $LiMnO_2$ particles were coated with a carbon black in the form of a coating film.

Comparative Preparation Example 1

A carbon black having a hollow structure was simply mixed with a $LiMnO_2$ active material in an amount of 1.5 wt. % relative to the active material using a Waring Blender, and the $LiMnO_2$ particles were coated with a carbon black in the form of particles.

Experimental Example 1

The SEM photographs of the materials prepared in Preparation Example 1 and Comparative Preparation Example 1 are shown in FIGS. 1 and 2 below.

Referring to FIGS. 1 and 2, it can be confirmed that when a carbon black having a hollow structure is mixed by the mechanofusion process as in Preparation Example 1, the carbon black is coated onto the entire surface in a thin and uniform film form, whereas in the case of Comparative Preparation Example 1, simple mixing is performed and thus, carbon black is agglomerated in the form of particles at the interface between the primary particles.

Example 1

1.5 wt. % of $LiMnO_2$ particles and carbon nanotubes prepared in Preparation Example 1 were mixed by a mechanofusion process using an NOB-130 device (Hosokawa Micron) to obtain a positive electrode active material in which a carbon nanotube was coated onto the carbon black coating layer.

Example 2

A carbon black having a hollow structure was mixed with a $LiMnO_2$ active material in an amount of 0.5 wt. % relative to the active material by a mechanofusion process using an NOB-130 device (available from Hosokawa Micron), and the $LiMnO_2$ particles were coated with a carbon black in the form of a coating film.

$LiMnO_2$ particles coated with carbon black and carbon nanotubes 0.5 wt. % were mixed by a mechanofusion process using an NOB-130 device (available from Hosokawa Micron) to obtain a positive electrode active material in which carbon nanotubes were coated onto the carbon black coating layer.

Comparative Example 1

A positive electrode active material was obtained in the same manner as in Example 1, except that in Example 1, the $LiMnO_2$ powder without any coating layer was used as the positive electrode active material.

Comparative Example 2

A carbon black having a hollow structure was mixed with a $LiMnO_2$ active material in an amount of 3 wt. % relative to the active material by a mechanofusion process using an NOB-130 device (available from Hosokawa Micron) to obtain a positive electrode active material in which $LiMnO_2$ particles were coated with a carbon black in the form of a coating film.

Comparative Example 3

Carbon nanotubes were mixed with a $LiMnO_2$ active material in an amount of 3 wt. % relative to the active material by a mechanofusion process using an NOB-130 device (available from Hosokawa Micron) to obtain a positive electrode active material in which $LiMnO_2$ particles were coated with CNT.

Comparative Example 4

Carbon Black Coating after CNT Coating

Carbon nanotubes were mixed with a $LiMnO_2$ active material in an amount of 1.5 wt. % relative to the active material by a mechanofusion process using an NOB-130 device (available from Hosokawa Micron), and the $LiMnO_2$ particles were coated with a carbon nanotube in the form of a coating film.

$LiMnO_2$ particles coated with the carbon nanotube and carbon black having a hollow structure 1.5 wt. % were mixed by a mechanofusion process using an NOB-130 device (available from Hosokawa Micron) to obtain a positive electrode active material with a structure in which the carbon black was coated onto the carbon nanotube coating layer.

Comparative Example 5

Applying Simple Mixing Instead of Mechanofusion Process

The $LiMnO_2$ particles prepared in Comparative Preparation Example 1 and carbon nanotubes 1.5 wt % were added and simply mixed to obtain a positive electrode active material.

Experimental Example 2

The convexity of the positive active materials of Examples 1 to 2 and Comparative Examples 1 to 5 was obtained by measuring with a Morphologi4 equipment (available from Malvern). As a result, the positive active material of Example 1 had a convexity of 0.76, the positive active material of Example 2 had a convexity of 0.80, the positive active material of Comparative Example 1 had a convexity of 0.95, the positive active material of Comparative Example 2 had a convexity of 0.98, the positive active material of Comparative Example 3 had a convexity of 0.91, the positive active material of Comparative Example 4 had a convexity of 0.92, and the positive active material of Comparative Example 5 had a convexity of 0.96.

From the above result, it can be confirmed that when the coating layer is formed as in Examples 1 and 2, the convexity is reduced to 0.9 or less. On the other hand, it can be confirmed that in the case of Comparative Examples, the convexity is still 0.9 or more.

Experimental Example 3

The positive active materials prepared in Examples 1 to 2 and Comparative Examples 1 to 5, and polytetrafluoroethylene (PTFE) as a binder were put into a Rheomix 300™ extruder (available from Thermo Scientific) in an amount of 3% by weight based on the total mixture, and mixing was performed at room temperature under a maximum torque of 180NN and 50 rpm for about 5 minutes.

The mixture was put into a lab calender (roll diameter: 100 mm, roll temperature: 85° C., 10 rpm) to produce a freestanding film having a thickness of 250 um and a porosity of 35 to 40%.

The room-temperature tensile strength of the freestanding film was measured as follows, and the results are shown in Table 1 below.

The tensile strength was measured according to JIS C 6511 test method adopted as a mechanical property evaluation standard in the copper foil industry, in which the freestanding film was pulled at a crosshead speed of 50 mm/min at room temperature in the MD direction using the testing machine UTM (manufactured by ZwickRoell in Germany, model name; Z2.5TN), and then the load at the time when the specimen was broken was measured. At this time, the tensile strength was calculated as follows.

Tensile strength ($kgf/mm^2$)=load value (kgf)/thickness (mm)×width (mm)

TABLE 1

| | Room-temperature tensile strength ($kgf/mm^2$) |
|---|---|
| Example 1 | 0.25 |
| Example 2 | 0.20 |
| Comparative Example 1 | 0.10 |
| Comparative Example 2 | 0.16 |
| Comparative Example 3 | 0.12 |
| Comparative Example 4 | 0.15 |
| Comparative Example 5 | 0.11 |

Referring to Table 1, it can be confirmed that according to the present disclosure, the room-temperature tensile strength is improved. This means that the fiberization of PTFE is performed better. In the case of Comparative Example 5, it can be confirmed that coating is performed in the same content and the same order, but when the simple mixing is used instead of the mechanofusion process, the amorphous carbon-based coating layer is not formed in the form of a coating film, the effect according to the present disclosure cannot be exhibited.

Experimental Example 4

The freestanding film was positioned on one side of an aluminum foil (20 μm) as a current collector so that the loading amount is 4.8 $mAh/cm^2$, and laminated through a laminating roll maintaining at 100° C. to manufacture an electrode.

At this time, the target thickness was set to 200 um, and the target porosity was set to 28 to 30%, and the gap of the laminating roll was adjusted so as to fall within the above range.

A coin-type half-cell was manufactured by using the electrode, and lithium-metal counter electrode having a thickness of 200 um, and using an electrolyte solution containing 1M $LiPF_6$ in a solvent having EC:EMC=2:8.

The coin-type half-cell manufactured above was charged and discharged 200 times under the current condition of 0.1 C-rate in the voltage range of 3.0 to 4.30V, and then the 100-time capacity retention rate relative to the one-time discharge capacity was calculated, and the results are shown in Table 2 below.

In addition, the coin-type half-cell was discharged once under the current condition of 2 C-rate, and then the capacity ratio was calculated compared to the 0.1 C discharge capacity, and the results are shown in Table 2 below.

TABLE 2

| | 100-time capacity retention rate (%) | 2.0 C discharge capacity ratio (%, relative to 0.1 C discharge capacity) |
|---|---|---|
| Example 1 | 95.5 | 90.1 |
| Example 2 | 92.1 | 88.4 |
| Comparative Example 1 | 80.9 | 54.8 |
| Comparative Example 2 | 89.4 | 75.6 |
| Comparative Example 3 | 85.6 | 63.7 |
| Comparative Example 4 | 87.2 | 72.3 |
| Comparative Example 5 | 84.7 | 60.5 |

Referring to Table 2, it can be confirmed that when manufactured by the method according to the present disclosure, the effect of improving the lifespan and output characteristics can be obtained. However, it can be confirmed that in the case of Comparative Example 1, PTFE fiberization was not performed well due to the non-use of the conductive material; in the case of Comparative Example 2, the surface of the coated active material was smooth and thus, PTFE fiberization was not performed well; in the case of Comparative Examples 3 and 4, surface agglomeration occurred due to insufficient coating properties of the active material; in the case of Comparative Example 5, the coating was performed in the same content and the same order, but when the simple mixing was used instead of the mechanofusion process, an amorphous carbon-based coating layer was not formed in the form of a coating film and thus, the effect according to the present disclosure cannot be exhibited.

INDUSTRIAL APPLICABILITY

According to the present disclosure, the positive electrode active material, in which an amorphous carbon-based coating layer in the form of a film is formed on the surface of the lithium transition metal oxide particles, and a carbon nanotube coating layer is formed on the amorphous carbon-based coating layer, increases the surface unevenness while improving the conductivity by these coating layers. Therefore, when used for a dry positive electrode, not only it facilitates the activation of PTFE binder fiberization, thus increasing electrode productivity and improving battery durability, but also it improves the conductive path between active materials, thus lowering battery resistance, and consequently, the lifespan and output characteristics of the secondary battery containing the same can be improved.

The invention claimed is:

1. A positive electrode active material for secondary battery comprising:

lithium transition metal oxide particles;

an amorphous carbon-based coating layer formed in the form of a coating film on the surface of the lithium transition metal oxide particles; and a carbon nanotube coating layer formed on the amorphous carbon-based coating layer, wherein the positive active material has a convexity of 0.6 to 0.9.

2. The positive electrode active material according to claim 1, wherein:

the amorphous carbon-based coating layer is physically bound to the lithium transition metal oxide particles in the form of a coating film.

3. The positive electrode active material according to claim 1, wherein:

the amorphous carbon-based coating layer comprises carbon black.

4. The positive electrode active material according to claim 1, wherein:

the carbon nanotube coating layer has a pi-pi interaction with the amorphous carbon-based coating layer.

5. The positive electrode active material according to claim 1, wherein:

an amorphous carbon-based material of the amorphous carbon-based coating layer and a carbon nanotube of the carbon nanotube coating layer are contained in an amount of 0.01 to 5% by weight based on a total weight of the positive electrode active material, respectively.

6. A freestanding film comprising:

the positive electrode active material according to claim 1, and a binder, wherein the binder comprises polytetrafluoroethylene (PTFE).

7. The freestanding film according to claim 6, wherein:

the polytetrafluoroethylene has a form in which the positive electrode active material is wound in the form of a fiber.

8. The freestanding film according to claim 6, wherein:

the freestanding film further comprises a conductive material.

9. The freestanding film according to claim 6, wherein:

a room-temperature tensile strength of the freestanding film is 0.17 to 1 $kgf/mm^2$.

10. A dry positive electrode in which the freestanding film according to claim 6 is formed on a positive electrode current collector.

11. A secondary battery comprising the dry positive electrode according to claim 10.

* * * * *